April 27, 1965
M. J. PERRY
3,181,118
LOW PRESSURE TIRE INDICATING SYSTEM
Filed Nov. 1, 1962
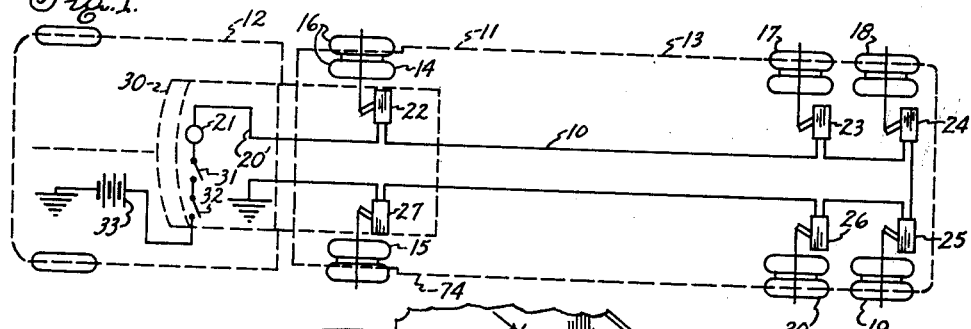
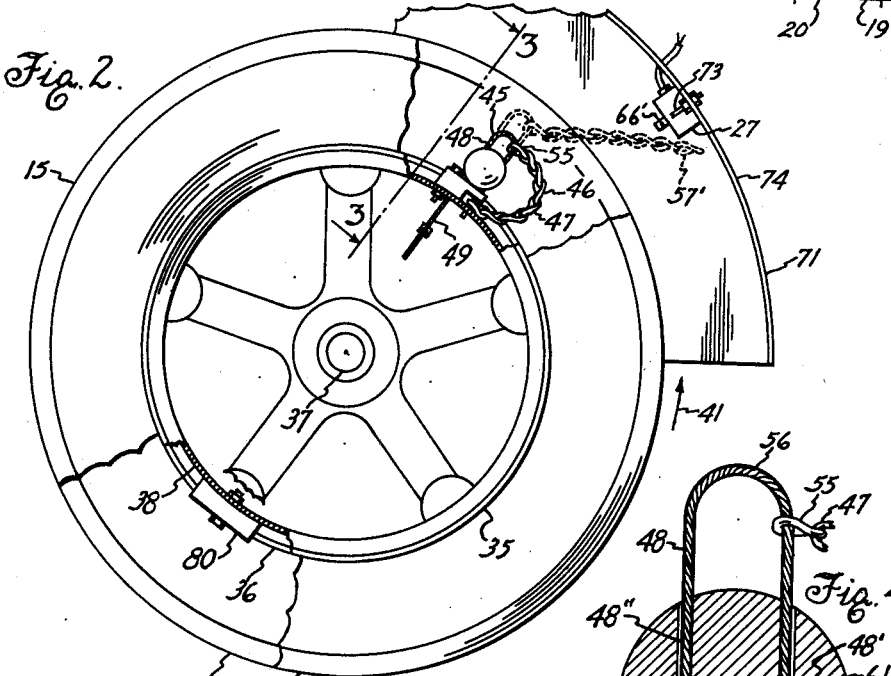
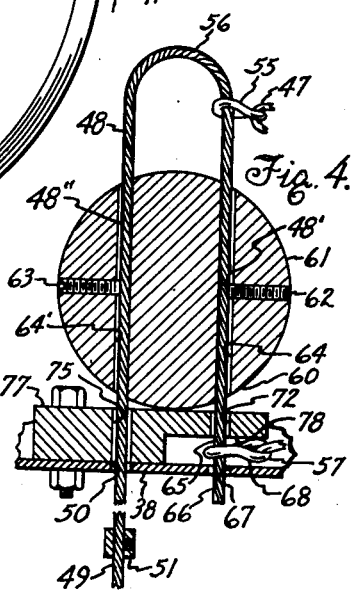
INVENTOR.
MARK J. PERRY
BY
Baldwin & Martin
ATTORNEYS United States Patent Office 3,181,118
Patented Apr. 27, 1965

3,181,118
LOW PRESSURE TIRE INDICATING SYSTEM
Mark J. Perry, Box 114, Star Rte., Fort George, Fla.
Filed Nov. 1, 1962, Ser. No. 234,748
11 Claims. (Cl. 340—58)

This invention relates to tire indicating and alarm systems, and more particularly concerns indicating and alarm systems for vehicles having pneumatic tires.

A general object of this invention is to provide improved low pressure tire indicating systems.

Another general object of this invention is to provide improved tire indicating systems for vehicles having sets of dual pneumatic tires.

A particular object of the present invention is the provision of a dual tire indicating system to give warning of decreasing pressure in either tire below a predetermined low pressure whereby to prevent the destruction or serious injury of the tire, such as might occur when one of the tires becomes flat or blows out during rotation thereof.

A specific object of this invention is to provide tire indicating systems that are inexpensive in construction, easily installed, and durable in service and use.

This invention is directed to a low pressure tire indicating system and particularly a flat tire indicating system for multi-wheeled tractor and trailers which are equipped with a plurality of sets of dual tires. The loss of air pressure in one tire of the dual tire set imposes an excessive load on the other tire of such set, and often causes a blow-out in such other tire. Also, the deflated tire, if the vehicle is driven a sufficient distance, will be greatly contorted and damaged by the road, and it will often burn up. An additional specific object of this invention is to warn the driver of a blow-out or sudden loss of air pressure while the vehicle is in motion so that the driver can stop and repair such blown-out tire or drive with care to the next stop at which the tire can be repaired.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIGURE 1 is a schematic view of the tire indicating system of the present invention, the tractor and trailer vehicle being shown in broken lines;

FIGURE 2 is a side elevational view of one set of dual pneumatic tires of the vehicle depicted by broken lines in FIGURE 1, portions of the actuating assembly of the indicating system of the invention being shown in their operative positions by broken lines;

FIGURE 3 is a transverse sectional view taken along line 3—3 of FIGURE 2;

FIGURE 4 is an enlarged elevational view of the actuating assembly of the indicating system of FIGURES 2 and 3; and FIGURE 5 is a fragmentary side elevational view similar to FIGURE 2 in accord with another embodiment of this invention.

Referring now more particularly to the drawing of FIGURE 1, a low pressure indicating system, generally depicted at 10, is shown schematically disposed on a vehicle 11, wherein vehicle 11 includes a well-known tractor 12 and trailer 13, shown by broken lines. The conventional tractor 12 is supported by two rear wheel assemblies 14 and 15 of dual pneumatic tires, collectively designated at 16, while trailer 13 is supported by four wheel assemblies 17, 18, 19 and 20 of dual tires. The tractor 12 and trailer 13 may be coupled, for example, by any well known fifth wheel assembly in a conventional manner.

The low pressure indicating system 10 comprises an electrical circuit 20' which includes an indicator 21 and a plurality of switches 22, 23, 24, 25, 26 and 27 in circuit with indicator 21, switches 22, 23, 24, 25, 26 and 27 respectively being disposed adjacent respective wheel assemblies 14, 17, 18, 19, 20 and 15. Indicator 21 is mounted within cab 30 of tractor 12 and a control switch 31 is connected between indicator 21 and ignition switch 32, the ignition switch 32 being connected to battery 33. When the ignition switch 32 and control switch 31 are in their on or closed positions and all of the switches 22 to 27 are closed, indicator 21 operates to indicate that all the tires 16 of the dual tire assemblies 14, 17, 18, 19, 20 and 15 are inflated above a predetermined low pressure, as hereinafter described more fully. When any of the switches 22 to 27 are opened, indicator 21 warns that one of the tires 16 of any of the dual tire assemblies 14, 17, 18, 19, 20 and 15 has deflated below a predetermined low pressure. The indicator 21 in the instant disclosed embodiment may be a light that is turned off when one of the switches 22 to 27 is opened. However, it is to be specifically understood that a relay could be inserted in the circuit 20' to reverse the operation of the system 10 by lighting indicator light 21 only when one of the switches 22 to 27 is opened. Other types of indicators, for example, a bell, could be used in the system without departing from the invention herein disclosed.

The construction details and mounting of the switches 22 to 27 of the system 10 may best be understood by referring to FIGURES 2, 3 and 4 wherein tire assembly 15 will be described to more clearly illustrate the various portions of the system. The other tire assemblies 14, 17, 18, 19 and 20 are understood to comprise equivalent elements as those described in detail by reference to tire assembly 15. A pair of rims 35 and 36 are mounted for rotation about axle 37, and a spacer rim 38 is nested between rims 35 and 36 to maintain the proper spacing between pneumatic tires 39 and 40, tires 39 and 40 being mounted on respective rims 35 and 36.

An actuating assembly is generally depicted at 45 carried by tire assembly 15 and such actuating assembly is mounted to spacer rim 38 for rotation therewith. Actuating assembly 45 comprises a flexible elongated element 46 which includes a chain 47 and a cable 48, cable 48 having one end portion 49 extending through opening 50 in spacer rim 38, and a stop member 51 is adjustably secured to cable end portion 49 within the periphery of spacer rim 38. One end portion 55 of chain 47 is connected to loop portion 56 of cable 48 and means, generally depicted at 60, is provided in the actuating assembly 45 for releasably maintaining the other end portion 57 of chain 47 in its inoperative position within the outer periphery of the tires 39 and 40 of tire assembly 15. The means 60 comprises a smooth rounded member 61 secured to cable 48 by set screws 62 and 63 forcibly engaging respective cable portions 48' and 48" which pass through passageways 64 and 64', passageways 64 and 64' extending through rounded member 61 along chords thereof. Rounded member 61 is nested between tires 39 and 40 when the tires are inflated above a predetermined low pressure and adjacent spacer rim 38. When one of the tires 39 or 40 deflates below a predetermined low pressure, the rounded member 61 moves outwardly toward the outer periphery of the tires 39 and 40 by the centrifugal force thereon due to the rotation of the tire assembly 15 in the direction of arrow 41, whereupon the other chain end portion 57 extends beyond the outer periphery of the tires 39 and 40, as depicted by broken lines 57' in FIGURE 2, to indicate the low pressure condition of the one tire.

In the embodiment of the invention depicted in FIGURES 1 through 4, the extended end portion 57' actuates switch 27 by forcibly tripping wire 65' which is attached to lever 66' of switch 27 whereupon indicator 21 is operated to indicate the low pressure condition of one of the tires 39 and 40.

Switch 27 is mounted to the body 74 of trailer 13 and specifically to the fender 71 thereof opposite outer tire 39 of tire assembly 15, and wire 65' is positioned between lever 66' and a post 73 attached to fender 71 opposite inner tire 40 whereby wire 65' extends generally along the axle 37 spacedly between inner face 71' of fender 71 and the outer periphery of tires 39 and 40. When the actuating assembly 45 is operative to have the chain end portion 57 extend beyond the outer periphery of tires 39 and 40, the wire 65' is tripped by the extended end portion 57 to actuate switch 27 by moving its lever 66' from its on or closed position shown in FIGURE 3 toward tire 39 to its off or open position.

In the embodiment of the invention depicted in FIGURE 5, the extended end portion 57 of chain 47 strikes against a steel tube 70 which is attached to fender 71 to indicate the low pressure condition of one of the tires 39 and 40 by sounding an alarm to the driver of vehicle 11.

It is contemplated that the chain may be slightly extended or be capable of extending a greater distance outwardly of the outer periphery of the tires to enable the chain to also strike the mud guards or fenders, for example, fender 71 of the vehicle, if desired. The distance that chain 47 may extend outwardly of the outer periphery of the tires may also be regulated by adjustably positioning stop member 51 on cable 48.

Actuating assembly 45 further includes latch means generally indicated at 65 for releasably maintaining end portion 57 of chain 47 in its inoperative position within the outer periphery of the tires 39 and 40, and when the chain end portion 57 is released by latch means 65, end portion 57 will move outwardly of the outer periphery of the tires due to the centrifugal force during rotation of the tire assembly 15. The latch means 65, clearly shown in FIGURE 4, comprises end portion 66 of cable 48 which slidably protrudes through opening 67 in spacer rim 38. Cable end portion 66 passes through chain link 68 at chain end portion 57 to maintain chain end portion 57 within the outer periphery of tires 39 and 40. An L-shaped bracket 77 is attached to spacer rim 38 to form a channel 78 therebetween for the reception of link 68 of chain 47. Bracket 77 includes an opening 72 registering with opening 67 in spacer rim 38 and cable end portion 66 extends through openings 72 and 67 and through the chain link 68 positioned within channel 78 whereby latch means 65 maintains end portion 57 of the chain 47 in its inoperative position within the outer periphery of tires 39 and 40. Bracket 77 has a passageway 75 extending therethrough which is aligned with opening 50 within spacer rim 38, and cable end portion 49 slidably extends through passageway 75 and opening 50.

When the tires 39 and 40 are properly inflated above a predetermined low pressure, the smooth rounded member 61 is nested between tires 39 and 40 and bracket 77 which is mounted to spacer rim 38 with chain end portion 57 maintained in its inoperative position within the outer periphery of tires 39 and 40 by latch means 65. When one of the tires 39 or 40 deflates below a predetermined low pressure, the rounded member 61 will move outwardly due to the centrifugal force thereon during rotation of wheel assembly 15, and cable 48 attached to rounded member 61 correspondingly moves with rounded member 61 from the positions shown by full lines in FIGURE 2 to the positions shown by broken lines in FIGURE 2. End portion 49 of cable 48 slides through opening 50 and passageway 75 until stop member 51 prevents further movement thereof whereby the movement of cable 48 and rounded member 61 is limited in their outward movement. The outward travel of rounded member 61 should always be limited to maintain rounded member 61 within the outer periphery of tires 39 and 40 to prevent damage to member 61 and damage to the tires. End portion 66 of cable 48 moves completely through opening 67 in spacer rim 38 and moves sufficiently outwardly to disengage link 68 whereupon the centrifugal force causes end portion 57 of chain 47 to extend beyond the outer periphery of the tires 39 and 40 to indicate the low pressure condition of one of the tires 39 and 40.

After a new tire or the old tire is repaired, the rounded member 61 is manually positioned between the inflated tires with the chain link 68 retained by latch means 65 as hereinbefore fully set forth.

The rounded member 61 should be positioned between tires 39 and 40 adjacent rim engaging portions 39' and 40'. The member 61 should not be positioned between the bulbar portions 39" and 40" because an object such as member 61 between bulbar portions 39" and 40" will cause overheating of the tires during flexions of tires 39 and 40 which could seriously damage the tires.

In the actual construction of the low pressure tire indicating system herein disclosed, the member 61 is preferably a metal or rubber ball, the cable 48 is a twisted steel cable and chain 47 is a steel, rubber coated chain. It is preferable to use a bracket 77 and the various attaching nuts and bolts of stainless steel to retard corrosion thereof or the components could be attached by welding. Due to the weight of the actuating assembly 45 on spacer rim 38, a counter balance weight 80 is attached to spacer rim 38 diagonally opposite to actuating assembly 45.

While the vehicle is motoring along the highway and a tire of any of the dual tire assemblies begins to deflate, the rounded member 61 will move outwardly toward the outer periphery of the tires to release chain end 57 when the pressure of the deflating tire decreases to about five to ten pounds of air pressure, whereupon the alarm is given. It is to be understood that the dimensions of the components of the system are selected in accord with the spacings between the tires of any dual tire assembly of the various makes and models of vehicles. Also the dimension of the rounded member 61 on a dual tire assembly may be varied for the system to indicate the low pressure condition of the tires at low pressures other than five to ten pounds or a flat tire without departing from the invention herein disclosed.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A low pressure indicating system for a plurality of dual pneumatic tire assemblies of a vehicle comprising an electrical circuit including an indicator means and switch means in circuit with said indicator, an actuating assembly respectively carried by and between the dual tires and mounted to each of said tire assemblies for rotation therewith, each said actuating assembly being responsive to a low pressure condition of either tire of respective said tire assembly below a predetermined pressure, said switch means being mounted to the body of the vehicle and cooperatively associated with each said actuating assembly, each said actuating assembly being adapted and arranged to actuate said switch means when said actuating assembly responds to said low pressure condition of either tire whereupon said indicator is operative to indicate said low pressure condition.

2. The low pressure indicating system as defined in claim 1 wherein each said actuating assembly includes a flexible element between the tires of each of said tire assemblies, said flexible element being maintained in its normally flexed inoperative position within the outer periphery of said tires and extending into its operative position beyond the outer periphery of said tires when said actuating assembly responds to said low pressure condition of either tire, said flexible element mechanically actuating said switch means after said flexible element extends into its said operative position.

3. A low pressure indicating system for a plurality of dual pneumatic tire assemblies of a vehicle comprising an electrical circuit including an indicator and switch means in circuit with said indicator, an actuating assembly respectively carried by and between the dual tires and mounted to each of said tire assemblies for rotation therewith, each said actuating assembly being responsive to a low pressure condition of either tire of respective said tire assembly below a predetermined pressure, each said actuating assembly including a flexible elongated element having one end portion connected to said tire assembly, means for releasably locking the other end portion in its inoperative position within the outer periphery of the tires of said tire assembly, said means releasing said other end portion of said elongated element to extend into its operative position beyond the periphery of said tires when said actuating assembly responds to said low pressure condition, said switch means being mounted to the body of the vehicle and cooperatively associated with said actuating assemblies, said other end portion of said elongated element mechanically actuating said switch means when said other end portion of said elongated element extends into its said operative position whereupon said indicator is operated to indicate said low pressure condition.

4. A low pressure indicating system for a plurality of dual pneumatic tire assemblies of a vehicle comprising an electrical circuit including an indicator and switch means in circuit with said indicator, an actuating assembly respectively carried by and mounted to each of said tire assemblies for rotation therewith, each said actuating assembly being responsive to a low pressure condition of either tire of respective said tire assembly below a predetermined pressure, each said actuating assembly including a flexible elongated element having one end portion connected to said tire assembly, a smooth rounded resilient member positioned adjacent the rims and caged between the tires of said tire assembly, said rounded member connected to said elongated element between its end portions, said rounded member when positioned adjacent said rims maintaining the other end portion of said elongated element in its inoperative position within the outer periphery of said tires, said rounded member being movable from adjacent said rims toward the outer periphery of said tires when said actuating assembly responds to said low pressure condition and said other end portion of said elongated member extends into its operative position beyond the periphery of said tires, said switch means being mounted to the body of the vehicle and cooperatively associated with said actuating assemblies, each said actuating assembly being adapted and arranged for said other end portion of said elongated element to mechanically actuate said switch means when said other end portion of said elongated element extends into its said operative position whereupon said indicator is operated to indicate said low pressure condition.

5. A low pressure indicating device for a dual pneumatic tire assembly wherein said tire assembly includes a pair of tires mounted on rims and a spacer rim therebetween comprising an actuating assembly connected to the spacer rim for rotation with the rims and tires, said actuating assembly including a smooth rounded member movably connected to the spacer rim, said rounded member being maintained between the tires when the tires are inflated above a predetermiend pressure, said rounded member moving outwardly toward the outer periphery of the tires when either of the tires deflate below a predetermined low pressure, a flexible elongated element having an end portion connected to said spacer rim, the other end portion of said elongated element being connected to said rounded member and retained in its inoperative position within the outer periphery of the tires while said rounded member is maintained, said other end portion extending into its operative position beyond the outer periphery of the tires upon the outward movement of said rounded member, said other end portion of said elongated element indicating the low pressure condition of the one tire when said elongated element extends beyond the outer periphery of the tires.

6. A low pressure indicating device for a dual pneumatic tire assembly wherein said tire assembly includes a pair of tires mounted on rims and a spacer rim therebetween comprising an actuating assembly connected to the spacer rim for rotation with the rims and tires, said actuating assembly including a smooth rounded member movably connected to the spacer rim, said rounded member being maintained between the tires and spacer rim when the tires are inflated above a predetermined pressure, said rounded member moving outwardly toward the outer periphery of the tires when either of the tires deflates below a predetermined low pressure, a flexible elongated element having an end portion connected to said rounded member, latch means releasably retaining the other end portion of said elongated element in its inoperative position within the outer periphery of the tires while said rounded member is maintaned between said tires and spacer rim, said latch means releasing said other end portion to extend into its operative position beyond the outer periphery of the tires upon the outward movement of said rounded member, said other end portion of said elongated element indicating the low pressure condition of the one tire when released by said latch means.

7. A low pressure indicating device for a dual pneumatic tire assembly wherein said tire assembly includes a pair of tires mounted on rims and a spacer rim therebetween comprising an actuating assembly connected to the spacer rim for rotation with the rims and tires, said actuating assembly including a smooth rounded member and a flexible elongated element connected to said rounded member and said spacer rim, said rounded member being nested between the tires when the tires are inflated above a predetermined pressure, said rounded member moving outwardly toward the outer periphery of the tires when one of the tires deflates below a predetermined low pressure, said flexible elongated element having an end portion releasably maintained within the outer periphery of the tires while said rounded member is nested, said end portion of said elongated element extending to its operative position beyond the outer periphery of the tires upon the outward movement of said rounded member, said end portion of said elongated element and said rounded member adapted and arranged to indicate the low pressure condition of the one tire.

8. A low pressure indicating device as defined in claim 7 further wherein said actuating assembly further includes latch means releasably maintaining said end portion in its inoperative position within the outer periphery of the tires while said rounded member is nested.

9. The low pressure indicating device as defined in claim 7 wherein said flexible elongated element comprises a cable and a chain attached at one of its end portions to said cable, said cable movably connecting said rounded member to said spacer rim, latch means releasably maintaining the other end portion of said chain in its inoperative position within the outer periphery of the tires while said rounded member is nested, said latch means including one end portion of said cable which passes through and which releasably engages said chain end portion.

10. The low pressure indicating device as defined in claim 7 wherein said flexible elongated element comprises a cable and a chain attached at one of its end portions to said cable, a bracket attached to the spacer rim and forming a channel for the reception of the other end portion of said chain, said cable having one end portion movably attaching said rounded member to said spacer rim and a stop element connected thereto for limiting the movement of said rounded member, the other end portion of said cable passing through an opening in said bracket through a link of the other end portion of said chain and through an opening in said spacer rim whereby said other end portion of said chain is maintained within the outer periphery of the tires, said rounded member and said cable attached thereto moving toward the outer periphery of the tires when one of the tires deflates below a predetermined low pressure and said other end portion of said cable moving outwardly of said opening in said spacer rim for disengaging said link of said chain other end portion to release said other end portion whereby the centrifugal force extends said chain other end portion outwardly of the outer periphery of the tires to its operative position to indicate the low pressure condition of the one tire.

11. A low pressure indicating device for a dual pneumatic tire assembly wherein said tire assembly includes a pair of tires mounted on rims and a spacer rim therebetween comprising an actuating assembly connected to the spacer rim for rotation with the rims and tires, said actuating assembly including a rounded resilient member movably connected to the spacer rim, said resilient member being releasably restrained by and between the tires when the tires are inflated above a predetermined pressure, said resilient member moving outwardly toward the outer periphery of the tires when either of the tires deflates below a predetermined low pressure, a flexible elongated element having an end portion connected to said spacer rim, the other end portion of said elongated element being connected to said resilient member and maintained in its inoperative position within the outer periphery of the tires while said resilient member is restrained, said other end portion extending into its operative position beyond the outer periphery of the tires upon the outward movement of said resilient member, said other end portion of said elongated element indicating the low pressure condition of the one tire when said elongated element extends beyond the outer periphery of the tires.

References Cited by the Examiner
UNITED STATES PATENTS 2,368,617    2/45    Rykken _____ 340—58 XR NEIL C. READ, *Primary Examiner.*